Feb. 2, 1960 C. L. WANLASS 2,923,817

LOGICAL GATING SYSTEM

Filed May 10, 1954 2 Sheets-Sheet 1

INVENTOR.
CRAVENS L. WANLASS
BY
William R. Lane
ATTORNEY

Feb. 2, 1960 C. L. WANLASS 2,923,817

LOGICAL GATING SYSTEM

Filed May 10, 1954 2 Sheets-Sheet 2

INVENTOR.
CRAVENS L. WANLASS
BY William R. Lane
ATTORNEY

United States Patent Office 2,923,817
Patented Feb. 2, 1960

2,923,817

LOGICAL GATING SYSTEM

Cravens L. Wanlass, Whittier, Calif., assignor to North American Aviation, Inc.

Application May 10, 1954, Serial No. 428,733

7 Claims. (Cl. 250—27)

Figure 1:
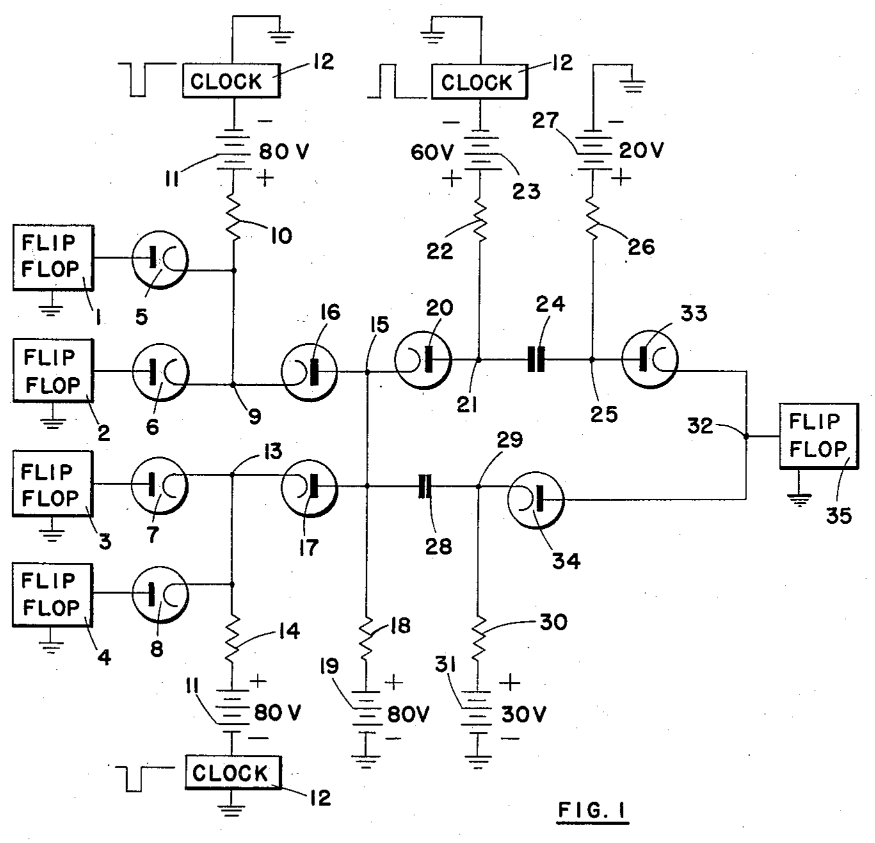

This invention pertains to digital computers and, more particularly, to a system of logical gating of information within a computer.

A digital computer performs mathematical operations with numbers expressed in digits expressed in readily distinguishable, discrete values. The information which moves within the computer may be arithmetic, for use in computation, or it may be instructional concerning the handling of the computation. The instructions may be encoded in the same digital system as the arithmetic numbers. The instructions and computations move through the computer and are carried out, generally at a rate determined by a "clock" within the computer. The "clock" is a pulse generator, such as a blocking oscillator, which provides a pulse which prevails throughout the computer to "gate," or govern the processing and flow of information along routes selected by the opening or closing of switches.

The binary numerical system, using the false or true conditions, forms the basis for most digital computers. Electrical components such as flip-flops (bistable multivibrators) and diodes are fundamentally binary and have been readily adopted for use in computers. The flip-flop is an electronic storage device which retains, or remembers, the information it receives by retaining a given state until triggered to the alternate state. Diodes are used as switches and gates to process information and allow passage of certain signals in accordance with other signals. The diode circuits interconnecting various sources of information and providing predetermined functions of such information are often referred to as "logic" or "logical circuits."

Among the difficulties encountered in the design of a satisfactory computer is the effect of spurious signals. One such effect occurs when the signal of a flip-flop is passed to succeeding circuitry. At times, this loading causes the flip-flop to incorrectly change its state. Other effects are due to transient signals which cause incorrect information to be passed within the logical circuitry of a computer.

Ordinarily, in computers, signals are received at the flip-flop only when they are to change state. Several clock pulses may occur before a particular flip-flop receives a signal. In the device of this invention, each flip-flop receives a pulse denoting its correct state each time the clock pulse occurs, and any stray signals are overridden.

Another problem is providing a source of power capable of driving several subsequent flip-flops in accordance with a given unit of flip-flops and diode gates. Particular schemes in the past have used isolating and driving circuits to overcome these difficulties requiring additional electronic equipment.

This invention proposes a novel gating system which is highly reliable because of its reiterative nature. Further, by the use of a particular output system, power consumption is reduced to a minimum.

It is therefore an object of this invention to provide a logical gating system having increased reliability.

Another object of this invention is to provide a reiterative logical gating system.

It is another object of this invention to provide a system of gating within a computer using a minimum of power.

A further object of this invention is to provide a logical gating system having a minimum of components.

A still further object of this invention is to provide a reiterative gating system which does not necessitate the use of flip-flops.

Figure 2:
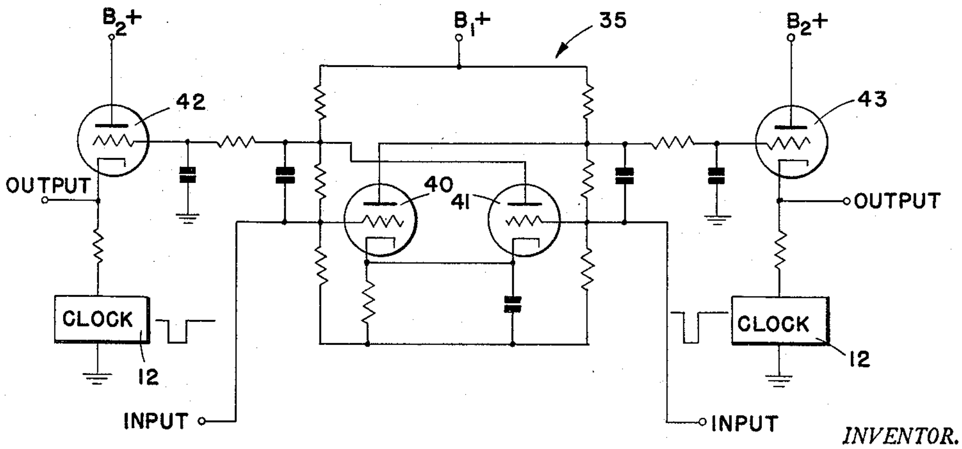
Figure 3:
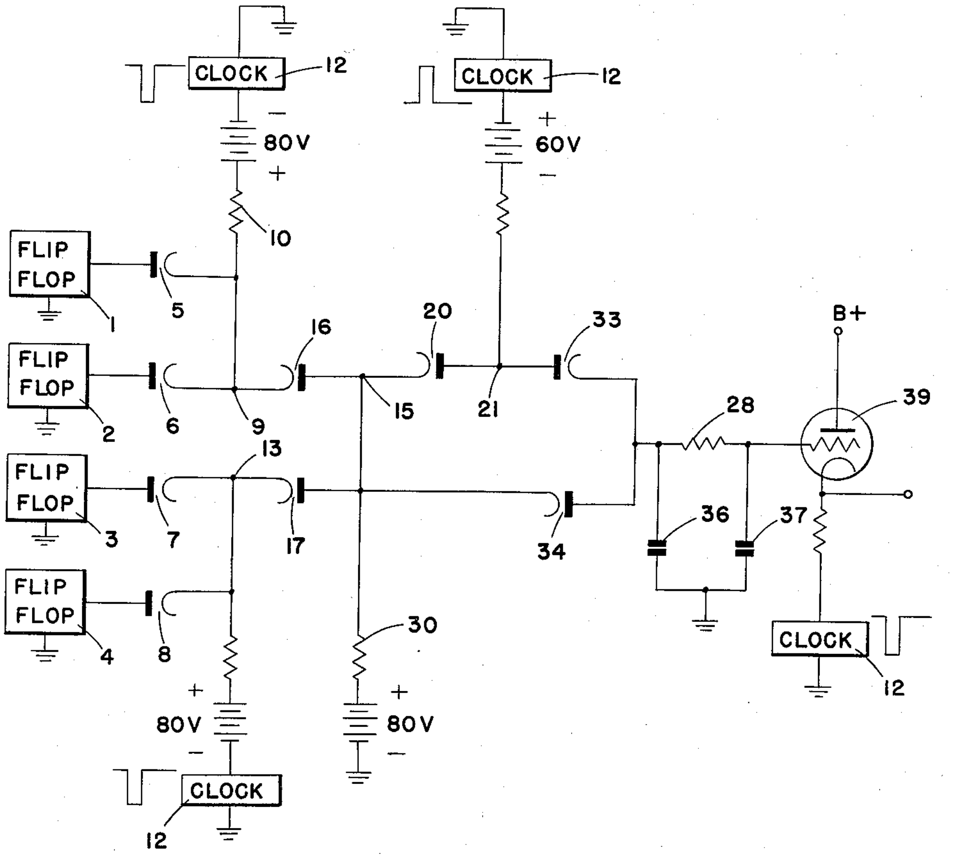

Other objects of invention will become apparent from the following description taken in connection with the accompanying drawings, in which Fig. 1 is a schematic which shows the logical gating system driving a flip-flop;

Fig. 2 is a schematic diagram of the driven flip-flop of Fig. 1;

And Fig. 3 is a schematic showing the logical gating system charging a storage capacitor.

Referring to Fig. 1, four flip-flops 1, 2, 3 and 4 provide a more positive (80 volts, false state) or less positive (60 volts, true state) output to respective diodes 5, 6, 7 and 8. Diodes 5 and 6 are connected in "and" gate fashion by having their cathodes connected to common point 9. Although illustrated as tubes, the diodes such as 5, 6, 7 and 8 may be germanium diodes or other type. Resistor 10 connects point 9 to 80 volt supply 11 which, in turn, is connected through clock 12 to ground. The elements named thus far provided gating means for flip-flops 1 and 2. The cathodes of diodes 7 and 8 are, likewise, connected to common point 13 through a resistor 14 to 80 volt supply 11 and clock source 12 to ground, providing a gating means for flip-flops 3 and 4.

Clock source 12 may be a blocking oscillator to provide regularly spaced 60 volt pulses several clock pulse duration intervals apart. It provides complementary pulses (positive and negative) with respect to ground. These pulses occur simultaneously. For convenience, the positive and negative pulses are shown as originating in a single pulse source, but the positive clock may be a separate, synchronized source. Negative pulses through clock 12 are received from D.-C. supply 11.

Point 15 is connected through diodes 16 and 17 to points 9 and 13. Resistor 18 and 80 volt supply 19 connect point 15 to ground. Diode 20 connects point 15 to point 21 which is connected through resistor 22, 60 volt supply 23, and clock 12 to ground. Capacitor 24 connects point 21 to point 25 which, in turn, is connected through resistor 26 to 20 volt supply 27 to ground.

Point 15 is also connected through capacitor 28 to point 29 which is connected through resistor 30 and 30 volt supply 31 to ground. Terminal 32, which provides the output of this logical network to flip-flop 35, is connected through diodes 33 and 34 to points 25 and 29.

A positive pulse (false) or a negative pulse (true) is received at terminal 32 depending on the state of flip-flops 1, 2, 3 and 4.

Point 9 is normally at 80 volts, assuming, of course, that diodes 5 and 6 are biased to nonconducting by flip flops 1 and 2. Diode 16, of course, would be nonconducting by reason of equal potential, 80 volts, on both sides. Inasmuch as diodes 5 and 6 connect flip-flops 1 and 2 in logical "and" fashion, common point 9 will assume the false potential (80 volts) if either flip-flop 1 or 2 is false upon the occurrence of a clock pulse. If neither is false upon the occurrence of a clock pulse, point 9 assumes the true potential (60 volts). Diodes 7 and 8 connect flip-flops 3 and 4 in similar logical "and" fashion to common point 13. Diodes 16 and 17, however, connect the points 9 and 13 in logical "or"

fashion to point 15. Therefore, point 15, which is normally at 80 volts, remains at 80 volts (false) only if points 9 and 13 are both at 80 volts (false). Point 21 is normally at 60 volts. If, during a clock pulse point 15 remains at 80 volts, point 21 will increase to 80 volts and a positive pulse is passed by capacitor 24 to point 25. Diode 33 is caused to conduct by this 20 volt pulse and a positive pulse is received at terminal 32. An alternate condition occurs if point 15 drops to 60 volts during a clock pulse because either point 9 or point 13 is 60 volts. In this case, a 20 volt negative pulse is received at capacitor 28, diode 34 conducts, and point 32 receives a negative pulse.

It is apparent from the foregoing explanation that the logical information (a positive pulse or a negative pulse which represents combined information from flip-flops 1, 2, 3 and 4) is obtained from the diodes and flip-flops and is reiterated upon the occurrence of each clock pulse at output 32 to be fed to flip-flop 35.

In generalizing the circuit of Fig. 1, if no negative pulse is received at point 15 so as to cause diode 34 to conduct and provide terminal 32 with a negative pulse, clock 12 causes diode 33 to conduct and terminal 32 receives a positive pulse. From another aspect, if diodes 16 and 17 do not allow clock 12 to provide a negative pulse through diode 34 to terminal 32, clock 12 will provide a positive pulse through diode 33 to terminal 32.

Flip-flop 35 is triggered to one state by a positive pulse and to another by a negative pulse. Such a flip-flop is illustrated in Fig. 2. The grids of either triodes 40 or 41 may be triggered to cause the respective tube to conduct or cease conducting and allow the other to conduct. The output of flip-flop 35 is taken from the plate of each tube and drives triodes 42 and 43 operated as cathode followers. The outputs of these cathode followers are also gated by clock 12 which is connected in the cathode circuit of each. Consequently, each of tubes 42 and 43 is allowed to conduct in accordance with its grid signal only when a negative clock pulse occurs.

Because of the reiterative nature of this logical gating scheme and because both false or true signals are produced by this single circuit, flip-flop 35 may be replaced as a storage element by a capacitor, as shown in Fig. 3. This results in further simplification of the circuit.

As in the previous example, flip-flops 1 and 2, Fig. 3, are connected by diodes in "and" gate fashion, as are flip-flops 3 and 4. Points 9 and 13 are connected by diodes 16 and 17 in "or" gate fashion to point 15. The remainder of the circuit is relatively simplified. If point 15 remains at its usual 80 volt potential, point 21 rises to 80 volts when a clock pulse occurs and diode 33 conducts, charging capacitor 36. Had point 15 dropped to the true potential (60 volts) at the clock pulse, diode 34 would act to assure that capacitor 36 is not above the true potential. In this manner, capacitor 36 receives information at each clock pulse. Capacitor 37 is somewhat smaller than capacitor 36 so that its voltage change has little influence on capacitor 36. Capacitor 37 forms a logical delay circuit with resistor 38 and feeds the information in capacitor 36 to tube 39. Tube 39 is operated in a cathode follower circuit and its conduction is controlled by the charge on capacitor 37. Tube 39 conducts and provides an output in accordance with the charge on capacitor 37 when the cathode of tube 39 is negatively pulsed by the clock source 12. In the system of Fig. 1, in order to properly drive flip-flop 35, a readjusting downward of D.-C. voltage levels is necessary. This is accomplished by capacitors 24 and 28, resistors 26 and 30, and D.-C. supplies 17 and 31. In capacitor storage shown in Fig. 3, no such readjustment of D.-C. voltage level is necessary. Therefore, the named elements may be left out.

It is noted that the above system gates D.-C. voltage levels rather than A.-C. pulses and, inasmuch as the information is gated only during clock pulses, considerable power is saved. In a particular unit of a computer using this form of gating, every flip-flop or storage device receives input information every clock pulse. A saving in equipment occurs due to the fact that only one input circuit to a flip-flop is required in order to trigger in the desired direction. Voltage levels may be chosen so that almost all of the diodes are biased in the reverse, or high resistance direction, between clock pulses, increasing the circuit reliability. It may also be pointed out that if the reiterative gating is throughout the computer, flip-flops 1, 2, 3, and 4 may be converted to the capacitive type of storage device receiving the output in Fig. 3.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a logical gating system, a plurality of storage devices, first diode gating means including biased diodes each connected to a respective storage device, clock pulse generating means connected to said diode gating means so as to change the bias on said diodes and allow said diodes to conduct during each clock pulse in accordance with the output of their respective storage devices, an output terminal connected to receive the output of said diode gating means, means for generating complementary clock pulses connected to said output terminal, and second diode gating means connected to the output of said first diode gating means and the output of said complementary pulse generating means so as to control the output of said complementary pulse generating during each clock pulse means in accordance with the output of said first diode gating means.

2. In a logical gating system, a plurality of storage devices, a respective diode connecting each said storage device to a first common point, first clock pulse generating means connected to intermittently allow each said diode to conduct during each clock pulse in accordance with the output potential of its respective storage device whereby the common point of said storage devices receives a pulse equal to the output potential of one or more of said storage devices, a diode connecting said common point to a second common point, means for placing a direct-current potential on said second common point, an output terminal, an output diode connecting said output terminal to said second common point, second means for generating clock pulses complementary to those generated by said first pulse generating means, a diode connecting the output of said second pulse generating means to said second common point, and a diode connecting the output of said second pulse generating means to said output terminal.

3. In a logical gating system, a plurality of storage devices, a plurality of first diodes each having their anodes connected to a respective storage device and their cathodes connected to a common point, negative clock pulse generating means connected to the cathodes of said diodes whereby the cathodes of said diodes receive a pulse in accordance with the output of one or more of said storage devices, a second diode having its cathode connected to receive the output from the cathodes of said first diodes, a D.-C. source connected to the anode of said second diode, a third and a fourth diode each having their cathodes connected to receive the output of the anode of said second diode, an output terminal connected to receive the output of the anode of said third diode, positive clock pulse generating means connected to the anode of said fourth diode, and a fifth diode whose anode is connected to receive the pulses from the anode of said fourth diode and whose cathode is connected to said output terminal.

4. In a logical gating system, a plurality of storage devices, a plurality of first diodes each having their anodes connected to a respective storage device and their cathodes connected to a common point, negative clock pulse generating means connected to the cathodes of said diodes whereby the cathodes of said diodes receive a pulse equal in potential to the output of one or more of said storage devices, a second diode having its cathode connected to the cathodes of said first diodes, a D.-C. source connected to the anode of said second diode, a third and a fourth diode each having their cathodes connected to receive the output of the anode of said second diode, an output terminal connected to the anode of said third diode, positive clock pulse generating means connected to the anode of said fourth diode, and a fifth diode whose anode is connected to receive the pulse output of the anode of said fourth diode and whose cathode is connected to said output terminal.

5. In a reiterative gating system, a plurality of storage devices, a periodically gated logical circuit comprised of diodes connected to receive the outputs of said storage devices and periodically provide a true signal in response to a predetermined condition of said devices, means synchronized with said periodically gated circuit for generating a false signal during each gating period of said gated circuit, an output terminal, means coupled with said logical circuit for providing a signal of first sense at said output terminal in response to said true signal, means coupled with said false signal generating means for providing a signal of sense opposite said first sense at said output terminal in response to said false signal, and means responsive to said true signal for disabling said last mentioned coupling means whereby during said gating periods distinct signals of mutually opposite sense appear at said output terminal in the presence or absence, respectively, of said true signal.

6. In a reiterative gating system, a plurality of storage devices, a periodically gated logical circuit comprised of diodes connected to receive the outputs of said storage devices and periodically provide a true signal of first sense in response to a predetermined condition of said devices, means synchronized with said periodically gated circuit for periodically generating a false signal of sense opposite said first sense, an output terminal, first and second mutually oppositely poled unidirectional conducting devices for respectively coupling said true and false signals to said output terminal, and means responsive to said true signal for disabling said second unidirectional device whereby during each gate period a signal of first sense is produced at said output terminal if said true signal occurs or a signal of opposite sense is produced at said output terminal if said true signal is absent.

7. In a periodically reiterative gating system, a plurality of storage devices, a logical circuit connected to receive the outputs of said storage devices and provide a true signal in response to a predetermined condition of said devices, an output terminal, clock pulse generating means for periodically gating the outputs of said devices through said logical circuit to said output terminal to provide a discrete pulse at said output terminal during every gating period in which said true signal occurs, complementary clock pulse generating means, and means conjointly responsive to said logical circuit and said complementary clock pulse generating means for providing at said output terminal, during every gating period in which said true signal is absent, a discrete pulse distinctly different from said first mentioned discrete pulse.

References Cited in the file of this patent

UNITED STATES PATENTS

| | | |
|---|---|---|
| 2,628,346 | Burkhart | Feb. 10, 1953 |
| 2,674,727 | Spielberg | Apr. 6, 1954 |
| 2,712,065 | Elbourn | June 28, 1955 |
| 2,735,005 | Steele | Feb. 14, 1956 |
| 2,762,936 | Forrest | Sept. 11, 1956 |
| 2,782,303 | Goldberg | Feb. 19, 1957 |
| 2,807,716 | Steele | Sept. 24, 1957 |
| 2,835,801 | Haueter | May 20, 1958 |